No. 659,332. Patented Oct. 9, 1900.
E. WHALLEY.
FRONT WHEEL AND YOKE FOR TRUCKS OR OTHER VEHICLES.
(Application filed Feb. 1, 1900.)
(No Model.)

Witnesses:
J. R. Garfield
N. I. Clemons

Inventor,
Enoch Whalley
by Chapin
Attorneys.

UNITED STATES PATENT OFFICE.

ENOCH WHALLEY, OF WILLIMANSETT, MASSACHUSETTS, ASSIGNOR OF ONE-HALF TO CHARLES H. CURRAN, OF HOLYOKE, MASSACHUSETTS.

FRONT WHEEL AND YOKE FOR TRUCKS OR OTHER VEHICLES.

SPECIFICATION forming part of Letters Patent No. 659,332, dated October 9, 1900.

Application filed February 1, 1900. Serial No. 3,619. (No model.)

*To all whom it may concern:*

Be it known that I, ENOCH WHALLEY, a citizen of the United States of America, residing at Willimansett, in the county of Hampden and State of Massachusetts, have invented new and useful Improvements in Front Wheels and Yokes for Trucks or other Vehicles, of which the following is a specification.

This invention relates to improvements in swiveling front wheels and yokes therefor for trucks and similar vehicles, the object being to provide an improved and simplified construction of said wheels and yokes particularly applicable to trucks for transporting merchandise and material on the floors of manufacturing establishments which provide for turning such trucks within a small radius, as is required for such service; and the invention consists in the peculiar construction of the wheel-supporting yokes and means for attaching the same to the floor of the truck and the yokes each to the other and to the tongue of the truck, all as hereinafter fully described, and more particularly pointed out in the claim.

Figure 2:
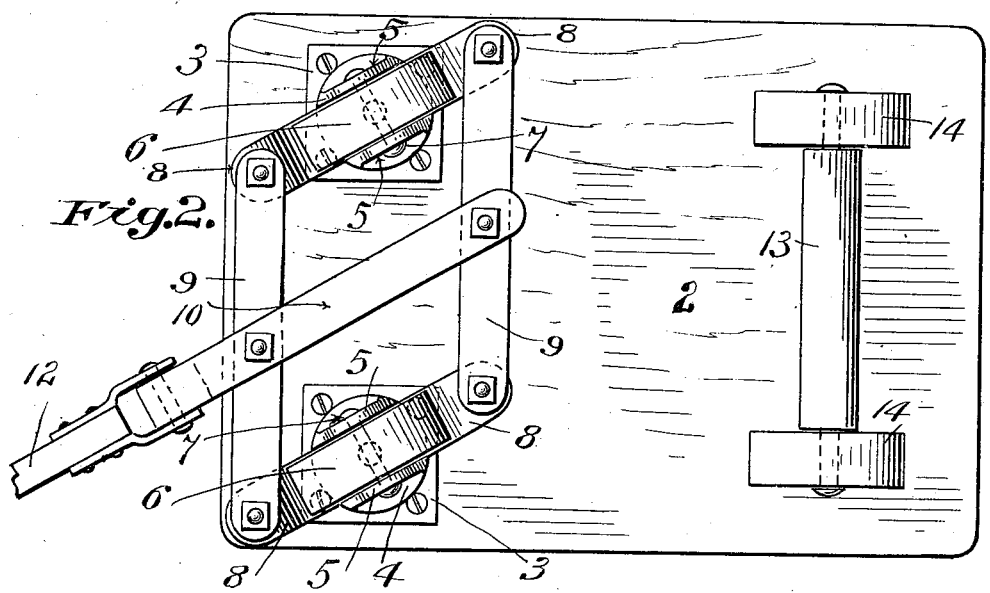
Figure 1:
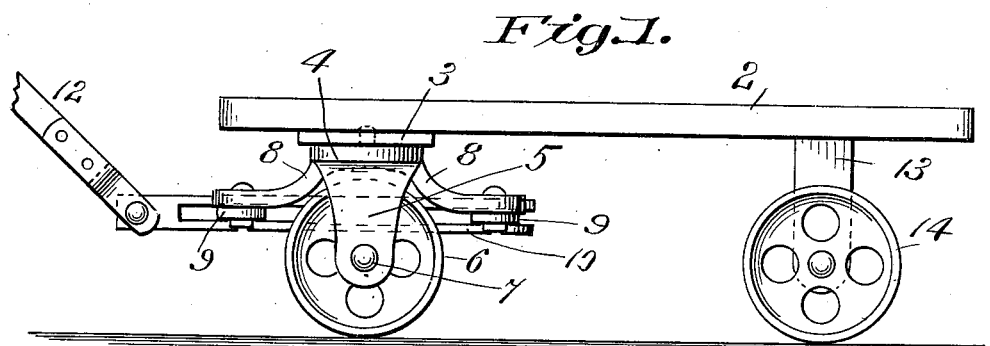
Figure 3:
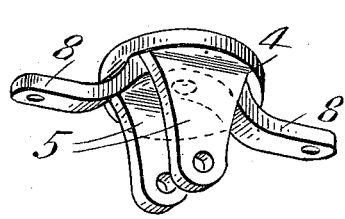

In the drawings forming part of this specification, Figure 1 is a side elevation of a truck containing a front-wheel and yoke construction embodying my improvements. Fig. 2 is a plan view of the under side of said truck, showing the forward truck-wheels and their connecting devices. Fig. 3 is a perspective view of one of the two yokes detached from the truck and the wheel removed.

Referring to the drawings, 2 indicates a floor of a truck, of any suitable material. To the under side of said floor, near one end thereof, as shown in Figs. 1 and 2, are secured, preferably by screw-bolts, as shown, two iron yoke-holding base-plates 3, each having a central socket, on each of which is pivotally attached a wheel-supporting yoke 4, having a central pivotal projection entering said socket and two parallel depending arms 5 5, between which a wheel 6 is hung by a bolt 7, passing through and secured to said arms and through the hub of said wheel 6.

It will be understood that the above-described construction of parts provides a yoke carrying a bearing-wheel of the truck, which has a suitable swiveling movement in the supporting-plate 3 thereof, which is attached to the floor of the truck. The said wheel and its described yoke devices may, when preferred, be used as a single front wheel centrally located under the floor of the truck; but in the construction herein illustrated it is preferred to employ a pair of said swiveling wheels at the front end of the truck and to provide for conveniently uniting the said wheel-yokes, so that they shall have corresponding swinging movements for directing the movement of the truck, each yoke being provided with two arms 8, extending in opposite directions forwardly and rearwardly under the truck, which arms are pivotally connected by means of two separated connecting-bars 9, and to said bars, midway between said yokes, a draw-strap 10 is pivotally connected, and to the outer end of said draw-strap is connected the usual tongue 12, by which the truck is drawn from place to place.

The above-described front-wheel-supporting construction for the truck is one of extreme simplicity and involves structural parts which can be fitted up from common iron castings with very slight expense, and for the purposes of transporting merchandise and material from one place to another on the floor of a manufactory they provide every requirement. The rear end of said truck is supported by any suitably-hung axle 13 and wheels 14.

Having thus described my invention, what I claim, and desire to secure by Letters Patent of the United States, is—

In a truck, a floor, the plates 3, 3, fixed under said floor, each having a central socket therein, two wheel-supporting yokes 4, each having a pivotal projection entering said sockets, two depending wheel-supporting arms 5, 5, and two forwardly and rearwardly extending arms 8, 8, and means in said arms 5, 5, for supporting a wheel for rotation, combined with two separated bars 9, 9, each pivotally connected to the extremities of said arms 8, 8, and a suitable draw-strap pivotally connected to said bars, intermediate of said yokes, substantially as described.

ENOCH WHALLEY.

Witnesses:
WM. H. CHAPIN,
K. I. CLEMONS.